United States Patent [19]

Strommer

[11] 3,955,486

[45] May 11, 1976

[54] FOOD PROCESSING APPARATUS

[75] Inventor: Palmer K. Strommer, Osseo, Minn.

[73] Assignee: General Mills, Inc., Minneapolis, Minn.

[22] Filed: Aug. 24, 1973

[21] Appl. No.: 391,431

[52] U.S. Cl. .............................. 99/323.4; 302/49; 426/508
[51] Int. Cl.² .......................................... A23L 1/18
[58] Field of Search .......... 99/483, 323.4; 426/445, 426/446, 508, 511, 230; 222/194; 302/49; 251/311

[56] References Cited
UNITED STATES PATENTS

| | | | |
|---|---|---|---|
| 2,565,546 | 8/1951 | Colburn | 302/49 |
| 3,231,387 | 11/1966 | Tsuchiya | 99/323.4 |
| 3,288,053 | 11/1966 | Perttula | 99/323.4 |
| 3,707,380 | 12/1972 | Dunning et al. | 99/477 |
| 3,730,729 | 5/1973 | Strommer | 99/323.4 X |

*Primary Examiner*—Robert W. Jenkins
*Assistant Examiner*—James A. Niegowski
*Attorney, Agent, or Firm*—G. O. Enockson; N. P. Friederichs

[57] ABSTRACT

Apparatus for treating particulate heat and pressure reactive food material. The food material is fed into an elongated treating chamber which is under pressure. The chamber has an inlet at one end and an outlet at the other end. The food material is fed into a continuous flow of gaseous fluid from the direction of the inlet and propelled through the elongated chamber and out of the outlet.

3 Claims, 7 Drawing Figures

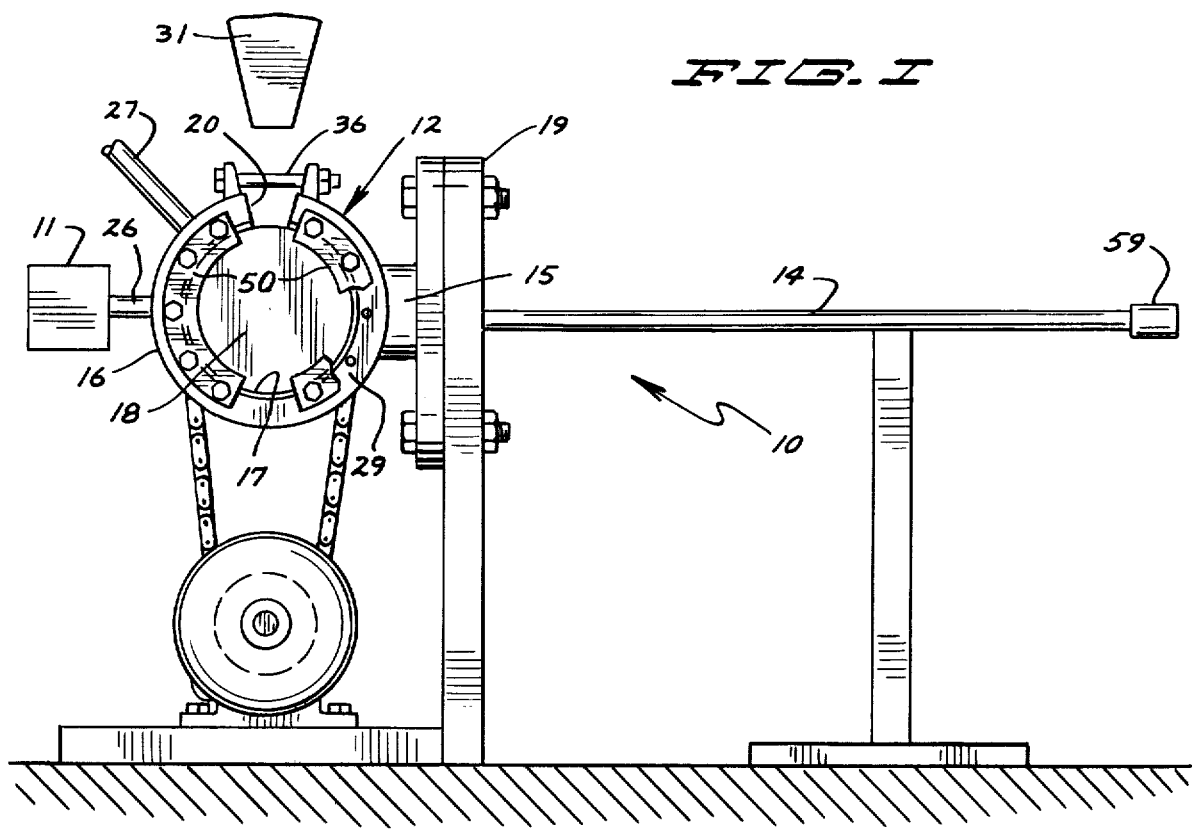
FIG. I
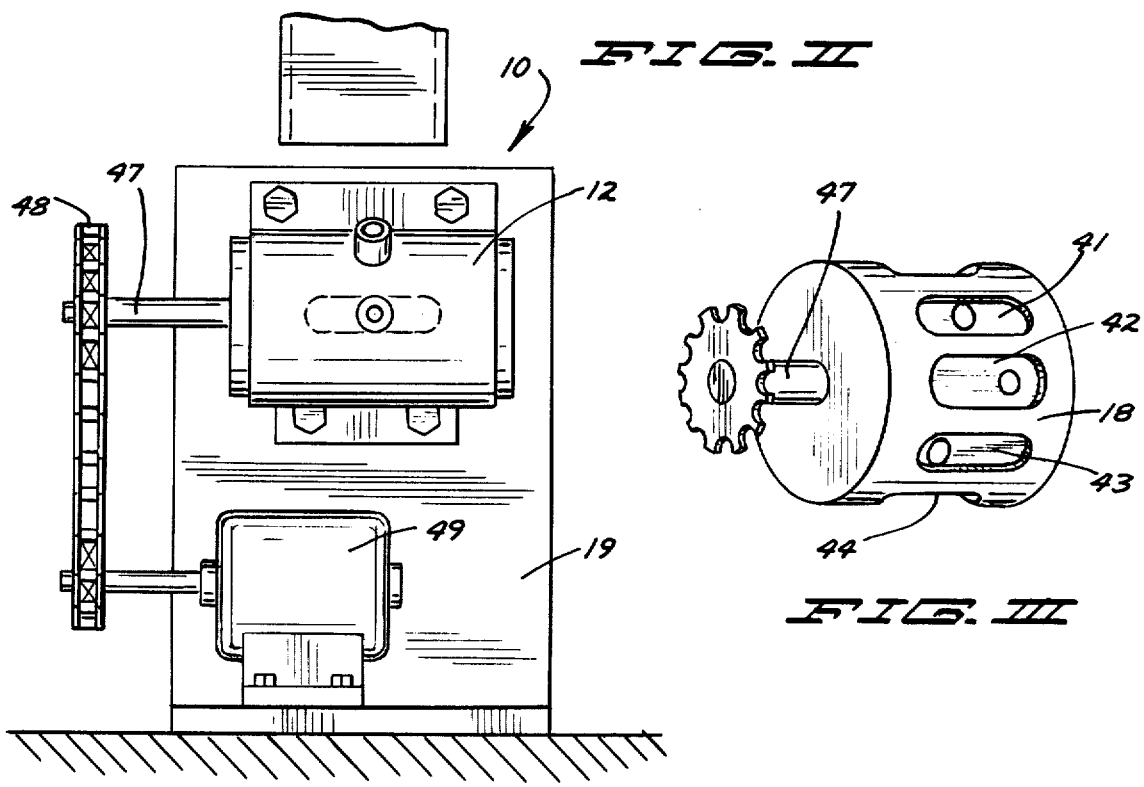
FIG. II
FIG. III

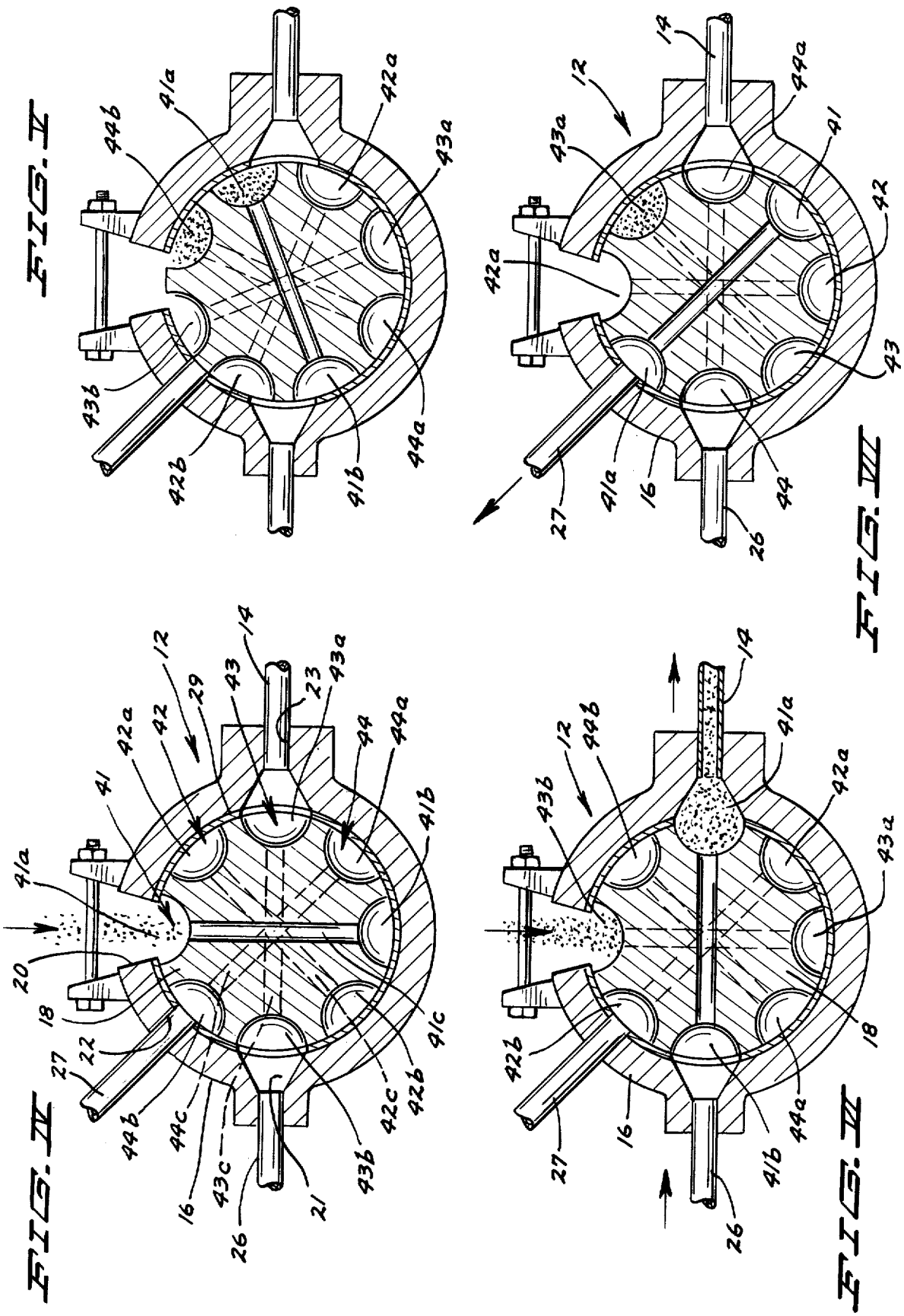

FOOD PROCESSING APPARATUS

BACKGROUND OF THE PRESENT INVENTION

The present invention relates to treating of food products and more particularly to treating food materials under heat and pressure.

In the past, food materials have been processed under heat and pressure using various types of apparatus and methods. Starch materials, for example, have been gelatinized by forming a a dough and then treating the dough in a puffing gun as shown in U.S. Pat. No. 3,231,387. Such puffing guns have not been suitable for treating material in the form of fine particulate material such as flour. Recently method and apparatus was discovered which is suitable for treating such fine particulate material. Such method and apparatus is disclosed and claimed in U.S. Pat. No. 3,730,729. The present invention is an improvement on the method and apparatus of U.S. Pat. No. 3,730,729.

The materials that may be processed according to the present invention are many and varied. The materials include any material that is reactive in the presence of the heat and pressure of the present invention. The reaction may be either a chemical or a physical reaction. The processing of the present invention may include one or more of the following: gelatinization, texturization, puffing, homogenizing and agglomerating.

One illustrative class of materials that may be processed according to the present invention includes the cereal flours and mixtures of cereal flours with other materials. The cereal flours typically include wheat flour, corn flour, rice flour, tapioca and the like. Another similar starchy fine particulate material is potato flour. One reaction that takes place when such starchy materials are subjected to the heat and pressure of the present invention is gelatinization.

Another class of reactive materials that may be treated according to the present invention is protein materials. In recent years substantial effort has been directed toward treating vegetable protein materials so as to provide such materials with texture and other characteristics commonly found in animal meat products. The vegetable protein materials are primarily soybean meal and flour, however, various other oil seed meals and flours also are used, such as peanut, cottonseed and sesame seed meals and flours. It is generally preferred to use protein concentrates of such oil seed meals typically including at least about 50% protein by weight. Untexturized protein material contains protein in discrete particles. Texturization takes place when the protein acquires a substantially continuous phase. The texturized material, when moist, is somewhat tough or chewy much like meat. The term "texturizing" as used herein will refer to the process of changing the discrete particles of protein into continuous phase protein.

It was recently discovered that finely-divided particulate protein material may be texturized by passing the material in a stream of gaseous fluid through an elongated cylinder or pipe and applying elevated pressure and temperature. This recently discovered method provides highly satisfactory texturized protein. Such method is disclosed and claimed in U.S. Pat. No. 3,754,926. The previous method necessitated use of a pressure tank or surge tank to maintain an elevated processing pressure in the cylinder or pipe. This was because the flow of gaseous fluid into the pipe or cylinder was discontinuous or pulsating. The present invention provides improved and simplified apparatus. For example, the need for a pressure tank has been eliminated in the present invention by provision of a continuous flow of gaseous fluid into the pipe or cylinder.

The protein material to be processed according to the present invention may be of the type used in previous texturizing processes and typically includes the various defatted oil seed meals and flours such as soybean, peanut, cottonseed and sesame. Various other untextured protein materials such as wheat gluten, yeast, sodium, caseinate and the like may be texturized according to the present invention. The protein material used in the present invention is preferably a flour-like material, particularly soybean flour which may have a protein content of 30% or more by weight.

A further class of reactive materials that may be treated according to the present invention includes those materials that may be homogenized. This class includes the oil containing materials such as finely ground dutched cocoa. The fat is normally present in cocoa powder as fat globules. In the process of the present invention the fat globules are broken up and uniformly distributed throughout the powdered particle thereby providing a dark cocoa product. The processed cocoa material disperses more readily in water than does the untreated cocoa powder. The cocoa is also agglomerated and puffed. A sugar and flour mixture may also be homogenized. The sugar is believed to melt and become uniformly spread on the surface of the flour.

THE PRESENT INVENTION

Apparatus according to the present invention is shown in the drawings as follows:

FIG. I shows a side view of the apparatus with portions broken away.

FIG. II shows an end view of the apparatus.

FIG. III shows a portion of a valve of the apparatus.

FIGS. IV–VII show cross sectional views of the valve in various positions of operation.

The apparatus 10 (FIG. I) may include a rotary valve 12 and a pipe or tube 14. The apparatus 10 is connected to a high pressure fluid source 11 such as a steam boiler which is capable of providing a fluid or steam pressure to the rotary valve 12 sufficient to cause the material to undergo reaction.

The rotary valve 12 includes a valve housing 16 with an opening or chamber 17 for reception of the rotary valve member or plug 18. The valve housing 16 has a base 15 for support of the valve 12 on bracket 19. The valve housing 16 has an upper opening 20 which serves as an inlet for reactive material. The housing 16 (FIG. IV) further includes openings 21, 22 and 23 for reception of pipes 26, 27 and 14 respectively. The pipes, for example, may be threadedly engaged in said openings. The pipe 26 is connected to the steam source 11 and feeds the pressurized steam to the valve 12. Pipe 27 is an exhaust pipe which depressurizes any residual steam pressure in valve 12 prior to the feeding of particulate material to the valve 12 through opening 20. Pipe 14 is the outlet through which material leaves valve 12. A hopper 31 (FIG. I) may be provided for feeding valve 12. A hopper 31 (FIG. I) may be provided for feeding particulate material to opening 20 in valve 12. The housing 16 has a bearing member 29 located in chamber 17 for rotatable support of the valve member 18. The bearing member 29 extends substantially around chamber 17 except for suitable openings which cooperate with openings 20, 21, 22 and 23 in housing 16. The valve housing 16 has a tightening means such as a bolt or screw 36 for drawing the housing 16 and bearing 29 tightly against the rotary valve member 18 thereby providing a steam seal between bearing 29 and the rotary valve member 18. The bearing 29 may be constructed from a brass cylinder.

The rotary valve member 18 (FIGS. III-VI) may be of steel and may be constructed from a solid cylinder or alternatively it may be formed by casting. The member 18 is provided with any desired number of sets of material feeding or conveying chambers such as 41, 42, 43 and 44. The member 18 will have typically four, five or six of such sets. Each set includes a pair of pockets such as 41a and 41b, as well as, an interconnecting passageway such as 41c. Set 42 includes pockets 42a, 42b and passageway 42c. Set 43 includes pockets 43a, 43b and passageway 43c. Set 44 includes pockets 44a, 44b and passageway 44c. The various pockets are each spaced sufficiently close to the adjacent pockets to permit simultaneous communication of the two pockets with the gaseous fluid source and at the same time permit simultaneous communication of the opposite two pockets with the opening 23 in valve housing 16. The result is that at all times during operation at least one feeding set provides a steam passageway between the steam source 11 and the pipe 14 and during a portion of the time to sets simultaneously provide steam passageway. FIG. IV shows one material feeding set, namely, set 43 providing interconnection between pipe 26 and pipe 14. FIG. V shows two sets, namely, sets 41 and 42 simultaneously providing interconnection between pipe 26 and pipe 14. The present invention provides a substantially steady pressure in pipe 14.

The rotary valve member 18 has a shaft 47 and a sprocket 48 for driven engagement with suitable power means such as motor 49 (FIG. I). The valve member 18 may be held within housing 16 by restraining plates, such as plate 50 which is secured to housing 16 by screws.

The tube 14 has a nozzle 59 which limits the escape of pressure from the apparatus 10 thereby providing a build up of pressure in tube 14. The nozzle 59 preferably provides a variable orifice which may open if a large piece of food material temporarily plugs the orifice thereby permitting the large piece to pass through the nozzle. Such a variable nozzle is disclosed and claimed in U.S. Pat. No. 3,707,380.

OPERATION OF THE PRESENT INVENTION

The reactive food material may be fed to the apparatus 10 such as through the hopper 31. If desired, suitable provision may be made for metering or controlling the amount of feed material passing through hopper 31. The feed material leaving hopper 31 falls through opening 20 in the housing 16 of valve 12 thus being deposited, for example, in pocket 41a as shown in FIG. IV. The valve member 18 may rotate in a clockwise direction such that pocket 41a moves into alignment with pipe 14 and pocket 41b moves into alignment with pipe 26 in FIG. V. At that point, the residual from pressure pipe 14 and the pressure from pipe 26 act on the food material. As shown in FIGS. IV-VII, the pockets such as 41a, 42a, 41b, 42b, respectively are spaced sufficiently close to each other that pockets 41b and 42b simultaneously communicate for a time with the steam source 11 such as through pipe 26. Pockets 41a and 42a likewise simultaneously communicate for a time with the pipe 14. At all times at least one of the sets 41-44 provide an operating fluid passage through valve 12. In other words, there is constant intercommunication between the steam source 11 and the pipe 14 thus providing a continuous stream of steam through the apparatus 10. Provision of the continuous stream of steam results in continuous maintenance of elevated pressure in the pipe 14 and thus a reaction environment for the food material.

The pressure exerted on the food material in valve 12 and pipe 14 is sufficient to provide the reaction. Good protein texturization has been obtained at 30 psig and apparently some texturization has been obtained even at 15 psig. The operating pressure in the present invention thus may be at least 15 psig. The pressure will generally be at least 55 psig, preferably 80 to 110 psig. The pressure exerted through pipe 26 by the fluid source 11 should be enough greater than the back pressure exerted by the pressure in pipe 14 that the food material is rapidly forced through tube or chamber 14 and nozzle 59. Although the present invention has been described with regard to steam, any suitable gaseous fluid may be used. The fluid provided by source 11 may be a fluid with a high heat transfer coefficient such as steam or a mixture of such a fluid with other gaseous fluid, for example, a mixture of steam and air. The temperature of the gaseous fluid is sufficient to provide the reaction such as texturization. The temperature may be at least 250° F. and preferably is at least 300°F. The valve member 18 continues to rotate, pocket 41a aligns with exhaust pipe 27 and residual pressure in pockets 41a, 41b and passageway 41c is relieved. Pocket 43b reaches the feed port and is loaded with material to be treated. Processing takes place using the various other pockets substantially as described with respect to pockets 41a, 41b and 42a, 42b. The valve member 18 may be rotated at any desired speed depending upon such things as the size of the pockets, the number of pockets and the feed rate of food material.

The present invention preferably may be used in texturizing various protein materials and using various operating conditions. The untextured protein may be a vegetable protein, such as soybean protein, a protist protein, such as yeast and other microbials, or animal protein, such as casein. The untextured feed material may be a typical defatted oil seed flour such as soybean flour, it may be a concentrate such as a soybean concentrate, or an isolate such as a soybean isolate. A material having a protein content as low as 30 percent (dry weight basis) and as high as 95 percent may be satisfactorily texturized according to the present invention. For most uses in preparing textured protein contemplated by the present invention, the protein content will be at least 50%, preferably about 55 to 75%. The term "percent" means percent by weight unless otherwise specified.

Protein material, having a moisture content as low as 4 to 6 percent and as high as 40 percent by weight, may be texturized according to the present invention. It has been found that increasing moisture content increases texturization. The maximum moisture content is believed to be limited only by the particular texturizing apparatus used. The range of moisture in the feed material is preferably between 10 to 26 percent and generally between 10 and 20 percent.

The maximum pressure used in the present invention is limited only by the particular apparatus used. In carrying out the invention using apparatus substantially like that shown in FIG. I, pressures typically at least as high as 140 psig and as low as 15 psig may be used. It has been found that an increase in pressure generally results in an increase in texturization and/or expansion. The preferred pressure conditions of the present invention are at least 25 psig, generally at least 55 psig, typically 80 to 110 psig.

The textured protein of the present invention may be used for the same purpose and in substantially the same manner as previously known types of texturized protein. The protein material, as it comes from the texturizing apparatus, may be impregnated with conventional meat analog serum typically including binder, flavoring and water, thereby producing a simulated beef chunk or a simulated chicken chunk. The protein material may be ground, such as with a Comitrol Cutter, hydrated and mixed with ground beef or pork sausage, thus acting as a meat extender. Alternatively, the texturized material may be finely chopped and impregnated with a conventional meat analog serum, thereby producing a simulated ground beef or simulated ground pork. For example, simulated ground beef may be prepared by mixing, by weight, about 3.5 parts beef tallow, 4.3 parts corn flour, 1.7 parts egg albumin, 1.2 parts brown sugar, 1.2 parts onion powder, 1.0 part salt, 50 parts water, 24 parts texturized protein material, beef flavoring and sufficient caramel coloring to obtain the desired cooked hamburger color. The mixture may be heated to set the egg albumin.

EXAMPLE I

Protein material was texturized according to the present invention using apparatus substantially like that shown in FIG. I. The apparatus had a ten pocket valve or in other words a valve having five feeding or conveying sets. The protein material was defatted, untoasted soy flour (200 mesh size). The protein material had a Protein Dispersibility Index of between 84 and 92% and a protein content* of about 50 to 55%. Water was added to bring the moisture content to 14% by weight. The feed rate of the mixture to the apparatus 10 was 17 pounds per minute. The temperature of the steam fed to the apparatus 10 was 435°F. The pressure from source 11 was between 90 and 115 psig. The product was texturized and had a shear press value of 180. The product had a water hold capacity of 2.4. Shear press values were determined by weighing out 75 grams (dry weight basis) of texturized protein material. The sample was placed in an excess of cold water and soaked at about 40°F. for 1.5 hours. The sample was drained for 5 minutes and divided into 3 equal parts by weight. The three parts were wrapped in plastic and allowed to stand at room temperature for 20 minutes. Each of the parts were tested in the Allo-Krammer Shear Press (Ser. No. 1042, Model No.-5-2H) acccording to conventional techniques using a 2500 pound ring and a ten-bladed head. The three values are added together. The term "water-holding capacity" refers to the total amount of water the protein material is able to hold and is determined by soaking the protein in an excess of water for 20 minutes and then draining for five minutes. The water holding capacity is equal to the wet weight minus the dry weight and that value divided by the dry weight.

*Protein content is by weight on moisture free basis

EXAMPLE II

Example I was repeated except the protein material was a blend of 85% soy flour (described in Example I) and 15% soy isolate (Promine — having a protein content* of about 95% and produced by Central Soya Co. Inc.) Spices and coloring were added prior to texturization. The processing conditions were as described in Example I. The product was well textured.

Protein content is by weight on moisture free basis.

The embodiments of the invention in which an exclusive property or privilege is claimed are defined as follows:

1. In apparatus for processing heat and pressure reactive particulate food material, said apparatus including an elongated cylinder, inlet feeding means adjacent a first end of said cylinder for feeding said particulate material to said cylinder, outlet means adjacent the other end of said cylinder, said outlet means defining a restrictive orifice; and a gaseous fluid source interconnected to said inlet feeding means; the improvement wherein said inlet feeding means comprises a rotary valve including means for continuously supplying gaseous fluid from said fluid source to said cylinder, said rotary valve including a rotatable plug and a valve housing for rotatably supporting said plug, said valve housing including a gaseous fluid inlet adjacent a first side of said housing and a gaseous fluid outlet adjacent the opposite side of said housing, said continuous fluid supply passing through said rotatable plug, said plug including a plurality of feeding sets, each of said sets including a passageway extending radially through said plug and a pair of pockets, one of said pockets being disposed at the radially outer ends of said passageway.

2. In the apparatus of claim 1 wherein said housing fluid inlet and said housing fluid outlet are continuously interconnected by at least one of said feeding sets during rotation of said plug.

3. In the apparatus of claim 2 wherein said housing fluid inlet and said housing fluid outlet are interconnected by a pair of said feeding sets during a portion of the rotation of said plug.

* * * * *

UNITED STATES PATENT AND TRADEMARK OFFICE
CERTIFICATE OF CORRECTION

PATENT NO. : 3,955,486
DATED : May 11, 1976
INVENTOR(S) : Palmer K. Strommer

It is certified that error appears in the above–identified patent and that said Letters Patent are hereby corrected as shown below:

Col. 2, lines 63 and 64; after "feeding" delete --- valve 12. A hopper 31 (FIG. I) may be provided for feeding ---.
Col. 3, line 29; "to" should be --- two ---.

Signed and Sealed this

Seventh Day of September 1976

[SEAL]

Attest:

RUTH C. MASON
*Attesting Officer*

C. MARSHALL DANN
*Commissioner of Patents and Trademarks*